United States Patent [19]

Toyonaga et al.

[11] Patent Number: 5,896,055
[45] Date of Patent: Apr. 20, 1999

[54] CLOCK DISTRIBUTION CIRCUIT WITH CLOCK BRANCH CIRCUITS CONNECTED TO OUTGOING AND RETURN LINES AND OUTPUTTING SYNCHRONIZED CLOCK SIGNALS BY SUMMING TIME INTEGRALS OF CLOCK SIGNALS ON THE OUTGOING AND RETURN LINES

[75] Inventors: Masahiko Toyonaga, Hyogo; Hisato Yoshida, Osaka; Michiaki Muraoka, Nara, all of Japan

[73] Assignee: Matsushita Electronic Industrial Co., Ltd., Osaka, Japan

[21] Appl. No.: 08/755,817

[22] Filed: Nov. 26, 1996

[30] Foreign Application Priority Data

Nov. 30, 1995 [JP] Japan .................. 7-312256

[51] Int. Cl.⁶ ........................................ H03K 3/00
[52] U.S. Cl. .................. 327/295; 327/293; 327/284; 326/93
[58] Field of Search ................ 327/290–299, 327/261, 263, 264, 268, 269, 271, 272, 284, 285; 326/93, 101

[56] References Cited

U.S. PATENT DOCUMENTS

| | | | |
|---|---|---|---|
| 4,514,749 | 4/1985 | Shoji | 257/664 |
| 4,998,262 | 3/1991 | Wiggers | 375/356 |
| 5,045,725 | 9/1991 | Sasaki et al. | 326/37 |
| 5,307,381 | 4/1994 | Ahuja | 375/107 |
| 5,361,277 | 11/1994 | Grover | 327/141 |
| 5,398,262 | 3/1995 | Ahuja | 375/356 |
| 5,432,823 | 7/1995 | Gasbarro et al. | 375/356 |
| 5,528,187 | 6/1996 | Sato et al. | 327/292 |

FOREIGN PATENT DOCUMENTS

| | | | |
|---|---|---|---|
| 53-112351 | 10/1978 | Japan | 327/291 |
| 63-087744 | 4/1988 | Japan . | |
| 63-293941 | 11/1988 | Japan . | |
| 1-143251 | 6/1989 | Japan . | |
| 2-161808 | 6/1990 | Japan | 327/292 |
| 4-221830 | 8/1992 | Japan . | |
| 4-229634 | 8/1992 | Japan . | |
| 5-102394 | 4/1993 | Japan . | |
| 6-97789 | 4/1994 | Japan . | |
| 7-58207 | 3/1995 | Japan . | |

*Primary Examiner*—Kenneth B. Wells
*Attorney, Agent, or Firm*—McDermott, Will & Emery

[57] ABSTRACT

A layout area includes a clock interconnection consisting of an upward interconnection and a downward interconnection. The upward interconnection extends from the output terminal of a clock buffer which receives an external clock signal to a turning point while passing along the vicinity of a plurality of flip-flops. The downward interconnection extends from the turning point to a free end, reversing along the upward interconnection. Clock branch circuits are provided in the vicinity of the flip-flops. The clock branch circuits have a function of letting a third clock signal make a transition when the sum of the time integral of a first clock signal on the upward interconnection and the time integral of a second clock signal on the downward interconnection has become equal to the time integral for one pulse of one of the first clock signal and the second clock signal.

6 Claims, 11 Drawing Sheets

CLOCK DISTRIBUTION CIRCUIT WITH CLOCK BRANCH CIRCUITS CONNECTED TO OUTGOING AND RETURN LINES AND OUTPUTTING SYNCHRONIZED CLOCK SIGNALS BY SUMMING TIME INTEGRALS OF CLOCK SIGNALS ON THE OUTGOING AND RETURN LINES

BACKGROUND OF THE INVENTION

The present invention relates to a clock distribution circuit which distributes clock signals to a plurality of storage elements in a synchronous sequential circuit.

A synchronous sequential circuit is a logical circuit including storage elements such as flip-flops and delay elements which operate synchronizing with respective clock signals. An LSI (large-scale integrated circuit) chip on which such a synchronous sequential circuit is mounted must distribute clock signals to all the storage elements at a minimum time difference. The time difference between clock signals is called a clock skew, and a clock distribution circuit with zero clock skew has been sought.

The well-known grid type clock distribution circuit is mainly used in a gate array and provided with a mesh clock wiring interconnection which is installed on the entire chip, and a clock buffer which is disposed in the periphery of the chip or in the center of the mesh clock interconnection so as to drive the clock interconnection. This type of circuit has a drawback of increasing interconnection capacitance. The well-known tree type clock distribution circuit has a tree structure clock interconnection which is composed of a clock buffer as the root, and flip-flops as the ends of the branches. This type of circuit includes subsidiary buffers each disposed at a branch point so as to keep a balance between the delays of clock signals on both sides of the branch point. This type of circuit has a drawback that the design and adjustment are difficult.

In order to overcome these problems, Japanese Laid-open Patent Application No. 4-229634 has suggested a clock distribution circuit which has the following structure. Two clock interconnections adjacent to each other are arranged in parallel on the chip and each interconnection is formed into a loop. One end of one clock interconnection is driven by a clock buffer and the opposite end of the other clock interconnection is driven by another clock buffer. The two clock interconnections are connected to a clock branch circuit at any position so as to mix and buffer the clock signals on both clock interconnections. The clock distribution circuit has succeeded in reducing a clock skew as the result that a flip-flop receives a clock signal which is generated by mixing the clock signals having a delay difference. The clock branch circuit is composed of two resistors to obtain the intermediate voltage of the clock signals on both clock interconnections, and PMOS and NMOS transistors each having a gate provided with the intermediate voltage. These transistors compose a CMOS inverter from which the generated clock signal is taken out.

However, the clock distribution circuit which is disclosed in Japanese Laid-open Patent Application No. 4-229634 still has a problem of requiring a large interconnection area to accommodate two loops which are formed by the two clock interconnections. In addition, the circuit is vulnerable to noise because clock signals on the two clock interconnections are applied to the common gates of the PMOS and NMOS transistors via each resistor.

SUMMARY OF THE INVENTION

An object of the present invention is to provide a clock distribution circuit which has a reduced interconnection area.

Another object of the present invention is to provide a clock distribution circuit which is noise-resistant.

The first clock distribution circuit of the present invention employs a small area structure which includes a clock interconnection consisting of an upward interconnection extending from one end to a turning point and a downward interconnection extending from the turning point to a free end, reversing along the upward interconnection. The one end of the upward interconnection is driven by a clock buffer. The first clock distribution circuit also employs clock branch circuits each of which has a function of letting a third clock signal make a transition when the sum of the time integral of a first clock signal on the upward interconnection and the time integral of a second clock signal on the downward interconnection has become equal to the time integral for one pulse of one of the first clock signal and the second clock signal.

In the first clock distribution circuit of the present invention, a source clock signal is supplied to the one end of the upward interconnection. The first clock signal has a delay against the source clock signal, and the second clock signal has a larger delay than the first clock signal. Each of the clock branch circuits lets the third clock signal make a transition in accordance with the time integrals of the first and second clock signals. Therefore, the delay of the third clock signal against the source clock signal is constant, whichever point on the clock interconnection the first and second clock signals are taken out from. As a result, a clock skew is reduced. Furthermore, the interconnection area is reduced due to the loopback structure of the clock interconnection. In addition, the clock distribution circuit is noise-resistant because the reduction of a clock skew is achieved by making use of the time integrals of clock signals on the upward and downward interconnections.

The second clock distribution circuit of the present invention employs a small area structure which includes a clock interconnection consisting of a main interconnection which has the longest route extending from the output terminal of a clock buffer to the farthest storage element, and a plurality of branch interconnections extending to the other storage elements. Each branch interconnection is partly composed of a high-resistance interconnection layer or a high-capacitance interconnection layer in order to make the delay of a clock signal on the main interconnection and the delay of each clock signal on the branch interconnections be equal to each other.

In the second clock distribution circuit of the present invention, a clock skew is reduced by determining interconnection impedance of each branch interconnection so that the delay of each branch interconnection can be equal to the delay of the main interconnection. In other words, the reduction in a clock skew is achieved by employing a tree-structure clock interconnection consisting of a main interconnection and a plurality of branch interconnections, and each branch interconnection is partly composed of a high-resistance interconnection layer or a high-capacitance interconnection layer. The second clock distribution circuit has another advantage that in designing LSI, interconnection impedance can be changed after the completion of the arrangement of the storage elements and clock interconnections.

DETAILED DESCRIPTION OF THE INVENTION

The clock distribution circuit of the present invention will be described as follows with reference to the drawings.

Figure 1:
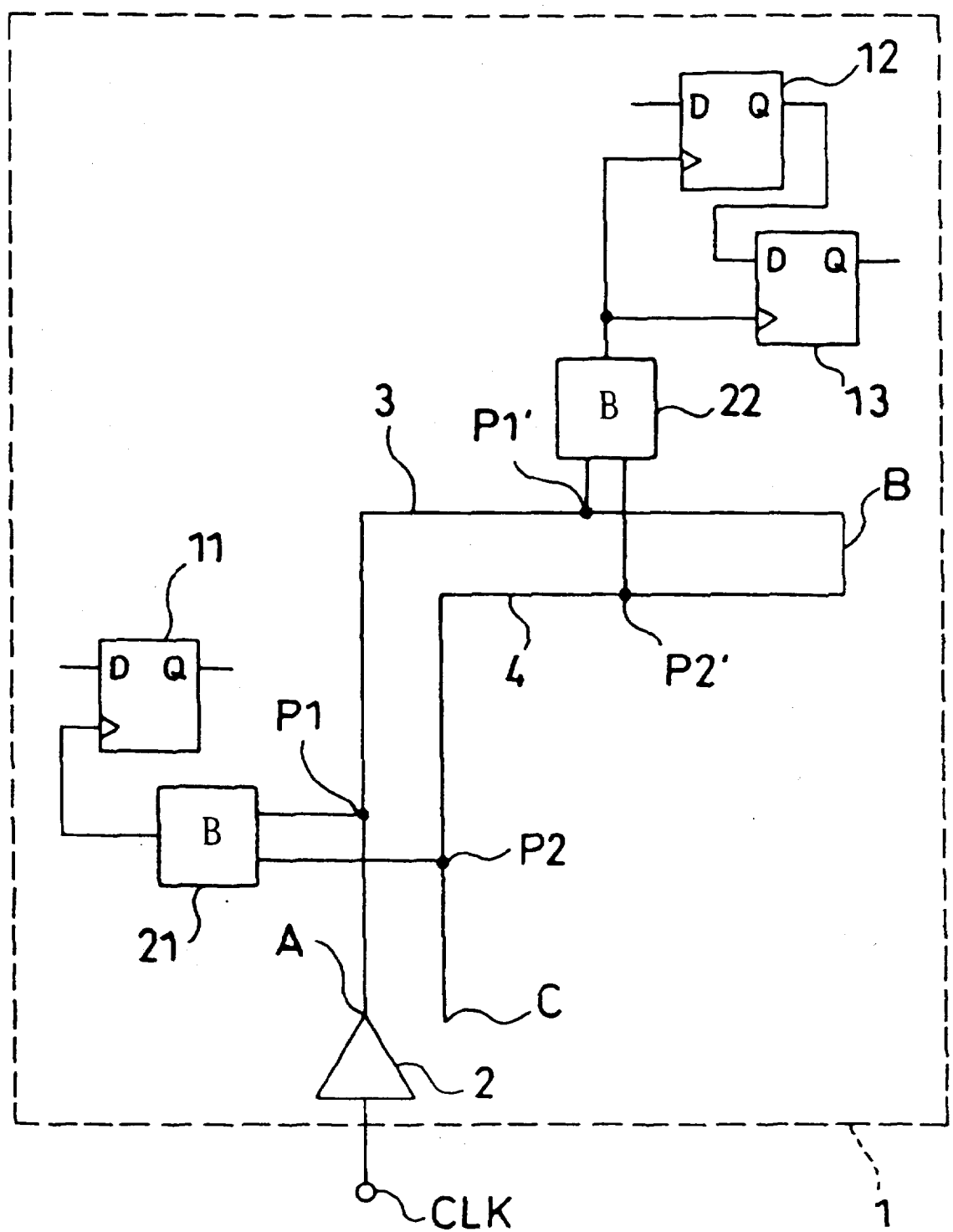
FIG. 1 is a block diagram which shows a configuration of the clock distribution circuit of the present invention.

FIG. 1 is a block diagram showing a configuration of the clock distribution circuit of the present invention. A layout area 1 includes a number of flip-flops which compose a synchronous sequential circuit. In this diagram, only three flip-flops 11, 12, and 13 are shown in order to make the explanation simple. A clock buffer 2 leads an external clock signal CLK as the source clock signal into the layout area 1. The clock interconnection is composed of an upward interconnection 3 and an downward interconnection 4. The upward interconnection 3 extends from the output terminal A of the clock buffer 2 to a turning point B, passing along the vicinity of the flip-flops 11, 12, and 13. The downward interconnection 4 extends from the turning point B to a free terminal C, reversing along the upward interconnection 3. A clock branch circuit 21 is disposed near the flip-flop 11, and another clock branch circuit 22 is disposed near the flip-flops 12 and 13. The clock branch circuit 21 receives a clock signal from a point P1 on the upward interconnection 3 and another clock signal from a point P2 on the downward interconnection 4. The clock branch circuit 21 then supplies the flip-flop 11 with a clock signal that makes a transition when the sum of time integrals of the received clock signals has become equal to the time integral for one pulse of either one of the received clock signals. The clock branch circuit 22 receives a clock signal from a point P1' on the upward interconnection 3 and another clock signal from a point P2' on the downward interconnection 4. The clock branch circuit 22 then supplies the flip-flops 12 and 13 with a clock signal that makes a transition when the sum of time integrals of the received clock signals has become equal to the time integral for one pulse of either one of the received clock signals.

In FIG. 1 the points P1 and P2 are placed close to the output terminal A of the clock buffer 2, and the points P1' and P2' are placed close to the turning point B. The clock signal on the point P1 has a delay against the source clock signal at the output terminal A of the clock buffer 2. The points P1, P1', P2', and P2 have greater delays in this order against the source clock signal.

Figure 2:
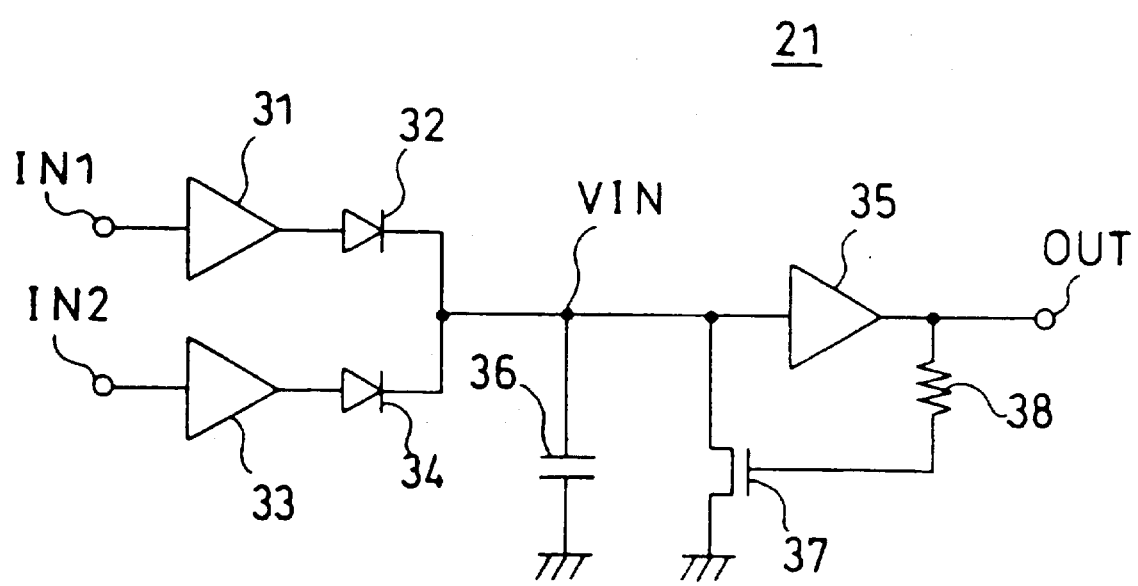
FIG. 2 is a diagram which shows the internal configuration of the clock branch circuit shown in FIG. 1.

FIG. 2 is a diagram which shows the internal configuration of the clock branch circuit 21. A first input terminal IN1 receives a clock signal at the point P1 on the upward interconnection 3 and a second input terminal IN2 receives a clock signal at the point P2 on the downward interconnection 4. These clock signals are referred to as the first clock signal and the second clock signal, respectively. An output terminal OUT supplies the flip-flop 11 with a clock signal, which is referred to as the third clock signal. The first clock signal is transferred to an internal node whose voltage is referred to as VIN via a buffer 31 and a diode 32 which prevents a backflow. The second clock signal is transferred to the same internal node via a buffer 33 and a diode 34 which prevents a backflow. Another buffer 35 is disposed between the internal node and the output terminal OUT. A capacitor 36 and an NMOS transistor 37 are disposed in parallel between the internal node and the ground. The gate of the NMOS transistor 37 is connected to the output terminal OUT via a resistor 38. The other clock branch circuit 22 has the same internal configuration as the clock branch circuit 21.

Figure 3:
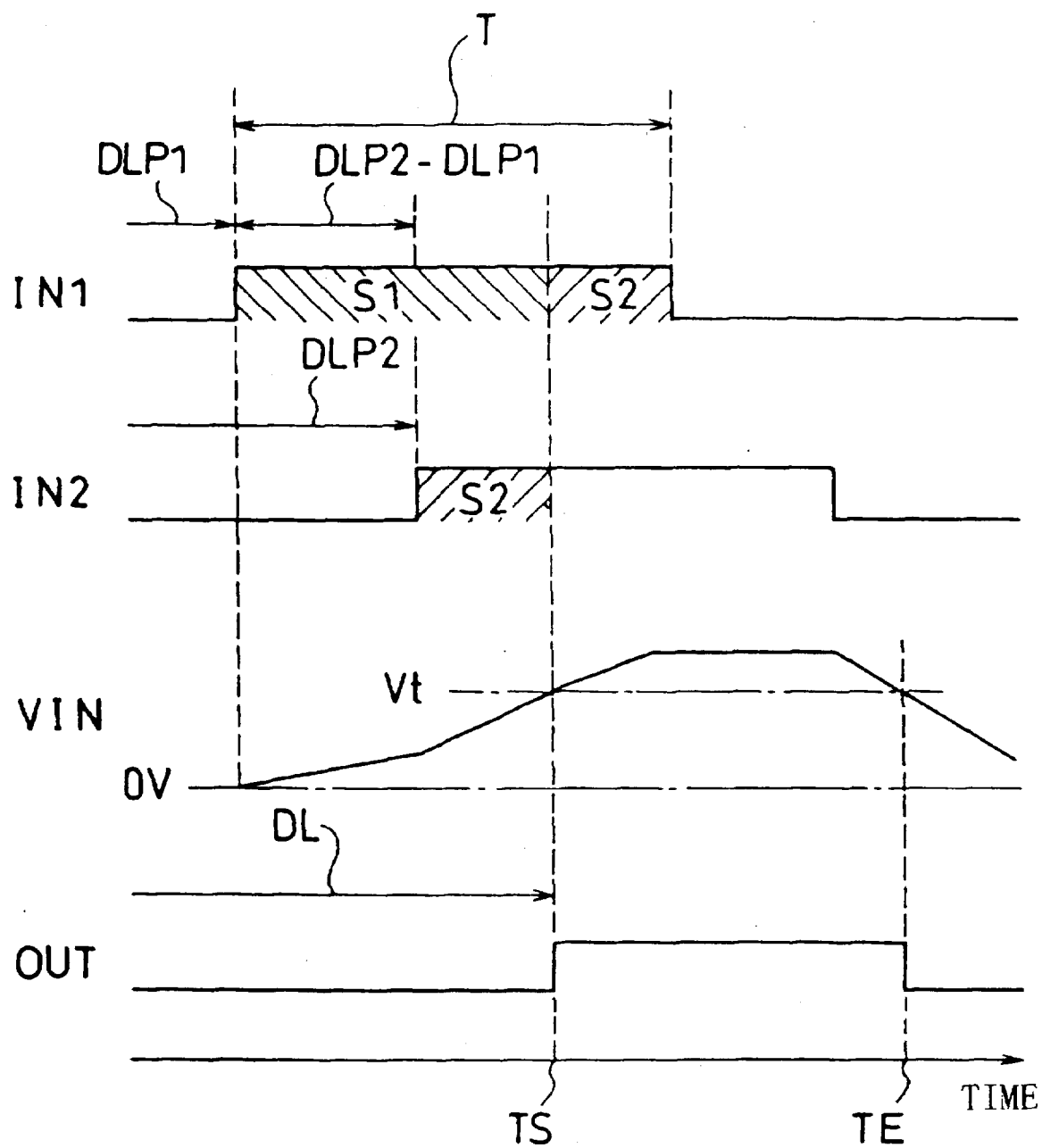
FIG. 3 is a timing chart which depicts the operation of the clock branch circuit shown in FIG. 2.

FIG. 3 is a timing chart which depicts the operation of the clock branch circuit 21 shown in FIG. 2. The first clock signal, which is supplied to the first input terminal IN1 has a pulse width T and a delay DLP1 against the source clock signal. The time integral for one pulse of the first clock signal is S1+S2. The second clock, which is supplied to the second input terminal IN2, has a delay DLP2 against the source clock signal. The delay DLP2 is greater than the delay DLP1. When the first clock signal has made a LOW to HIGH transition, the capacitor 36 starts to be charged via the buffer 31 and the diode 32, and the voltage VIN of the internal node starts to rise from 0 V. Later, when the second clock signal has made a LOW to HIGH transition, the capacitor 36 is further charged via the buffer 33 and the diode 34, which causes the voltage VIN to rise rapidly. When the time integral of the second clock signal has become S2, the voltage VIN exceeds the threshold voltage Vt of the buffer 35. In other words, at the time point TS, the sum of the time integral S1 of the first clock signal and the time integral S2 of the second clock signal reaches the time integral S1+S2 which corresponds to a time integral of one pulse of either clock signal. Then, the third clock signal obtained from the output terminal OUT makes a LOW to HIGH transition, and as a result, the gate of the NMOS transistor 37 is provided with a voltage of high level and the NMOS transistor 37 is turned on. Consequently, the capacitor 36 starts to be discharged. However, while one of the first and second clock signals is stretched high, the charge of the capacitor 36 is continued, so that the voltage VIN of the internal node does not immediately fall below the threshold voltage Vt of the buffer 35. In the chart of FIG. 3 the voltage VIN of the internal node becomes lower than the threshold voltage Vt of the buffer 35 at the time point TE, and the third clock signal which has been output from the output terminal OUT makes a HIGH to LOW transition. The pulse width of the third clock signal can be controlled by changing the property of the NMOS transistor 37.

As can be realized from the chart of FIG. 3, the delay DL of the third clock signal against the source clock signal in the clock branch circuit 21 is expressed by the following equation (1):

$$DL=DLP2+\{T-(DLP2-DLP1)\}/2 \quad (1).$$

In the same manner, the delay DL' of the output clock signal against the source clock signal in the clock branch circuit 22 is expressed by the following equation (2):

$$DL'=DLP2'+\{T-(DLP2'-DLP1')\}/2 \quad (2).$$

Here, the delay DLP1' belongs to the clock signal at the point P1' on the upward interconnection 3 against the source clock signal, and the delay DLP2' belongs to the clock signal at the point P2' on the downward interconnection 4 against the source clock signal.

In FIG. 1, it is supposed that the upward interconnection 3 which extends between the output terminal A of the clock buffer 2 and the turning point B, and the down interconnection 4 which extends between the turning point B and the free terminal C have a length of 10 mm. The length between the turning point B and the point P1 along the upward interconnection 3 or the point P2 along the downward interconnection 4 is 8 mm. The length between the turning point B and the point P1' along the upward interconnection 3 or the point P2' along the downward interconnection 4 is 2 mm. The upward and downward interconnections 3 and 4 are made of aluminum having a width of 0.8 µm, resistance per unit length of 120Ω/mm, and capacitance per unit length of 0.1 pF/mm or $10^{-4}$ nF/mm. Under these conditions, the following approximate equations are obtained.

$$DLP1=(120\times2)\times(10^{-4}\times20)=0.48 \text{ ns}$$

$$DLP1'=(120\times8)\times(10^{-4}\times20)=1.92 \text{ ns}$$

$$DLP2'=(120\times12)\times(10^{-4}\times20)=2.88 \text{ ns}$$

$$DLP2=(120\times18)\times(10^{-4}\times20)=4.32 \text{ ns}.$$

When T=6.0 ns, the following equations are obtained from the equations (1) and (2).

$$DL=4.32+\{6.0-(4.32-0.48)\}/2=5.4 \text{ ns}$$

$$DL'=2.88+\{6.0-(2.88-1.92)\}/2 =5.4 \text{ ns}.$$

As apparent from the above mathematical explanation, when the first clock signal which has been taken out from a point having any distance of L (0<L<10 mm) from the turning point B on the upward interconnection 3 and the second clock signal which has been taken out from a point having the distance L from the turning point B on the downward interconnection 4 are input to the clock branch circuit shown in FIG. 2, the third clock signal with a constant delay of 5.4 ns against the source clock signal is obtained. Thus, the clock distribution circuit shown in FIG. 1 has achieved an approximately zero clock skew. In addition, by the employment of the loopback clock interconnection, the interconnection area has been reduced as compared with that of the conventional double-loop structure. Furthermore, the clock distribution circuit has been freed from noise as the result that the reduction in a clock skew has been achieved by introducing the capacitor 36 into the clock branch circuits 21 and 22 by taking advantage of the time integrals of the clock signals on the upward and downward interconnections 3 and 4.

The upward and downward interconnections 3 and 4 shown in FIG. 1 can be easily formed by dividing a wide clock interconnection which extends to the turning point B through the vicinity of the flip-flops 11, 12, and 13 into two in the longitudinal direction.

Figure 4:
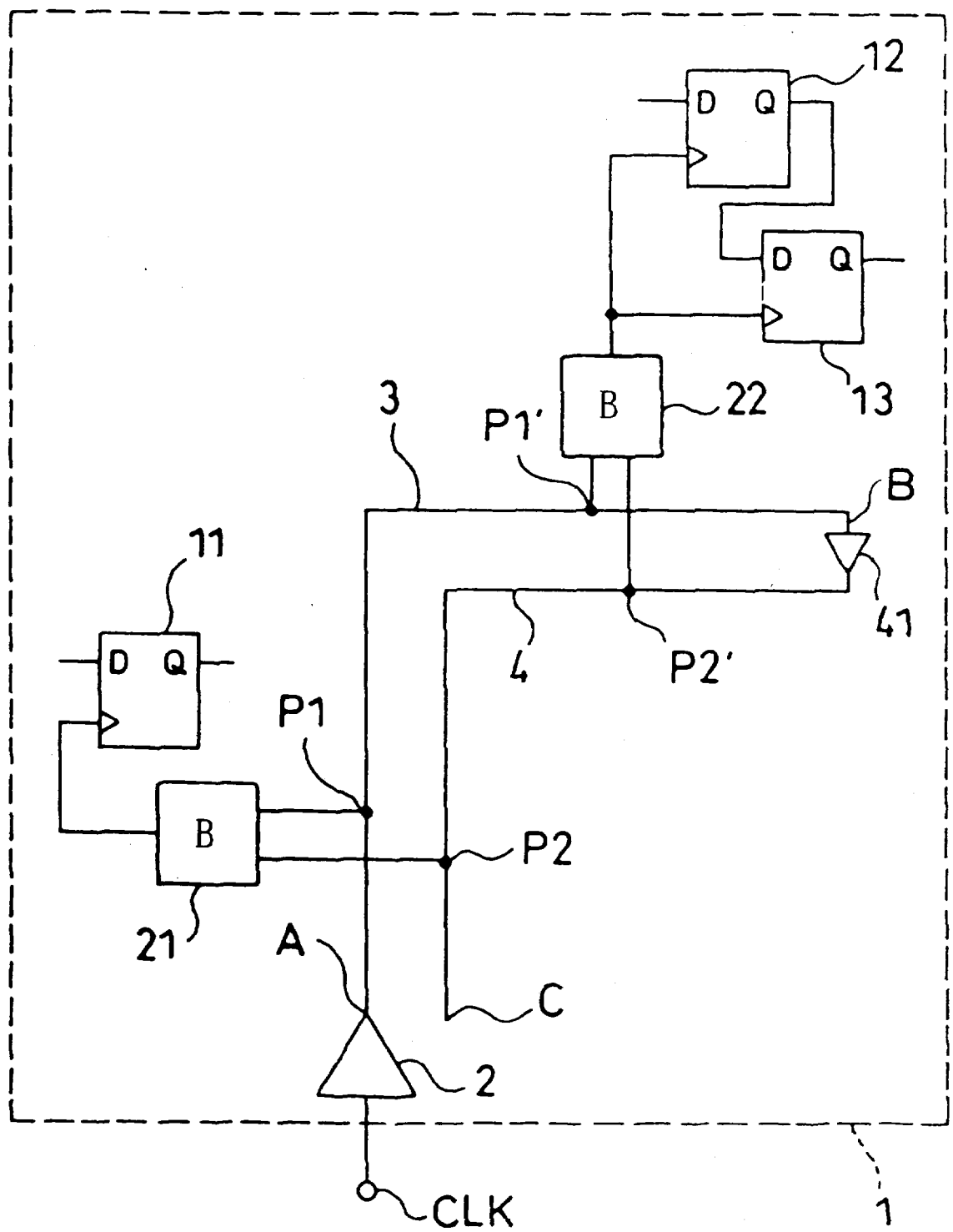
FIG. 4 is a block diagram which shows another configuration of the clock distribution circuit of the present invention.

The clock distribution circuit shown in FIG. 4 is formed by providing a subsidiary buffer 41 near the turning point B on the clock interconnection in the clock distribution circuit shown in FIG. 1 The provision of the subsidiary buffer 41 reduces the capacitance of the clock interconnection by half. When the delay of the subsidiary buffer 41 is 0.5 ns, the following approximate equations are obtained.

$$DLP1=(120\times2)\times(10^{-4}\times10)=0.24 \text{ ns}$$

$$DLP1'=(120\times8)\times(10^{-4}\times10)=0.96 \text{ ns}$$

$$DLP2'=(120\times10)\times(10^{-4}\times10)+0.5+(120\times2)\times(10^{-4}\times10)=1.94 \text{ ns}$$

$$DLP2(120\times10)\times(10^{-4}\times10)+0.5+(120\times8)\times(10^{-4}\times10)=2.66 \text{ ns}.$$

When T=6.0 ns, the following equations are obtained from the above equations (1) and (2).

$$DL=2.66+\{6.0-(2.66-0.24)\}/2=4.5 \text{ ns}$$

$$DL'=1.94+\{6.0-(1.94-0.96))\}/2=4.5 \text{ ns}.$$

Thus, in the clock distribution circuit shown in FIG. 4, a third clock signal which has a constant delay of 4.5 ns against the source clock signal is obtained by making use of the first clock signal which has been taken out from a point having a distance L (0<L<10 mm) from the turning point B on the upward interconnection 3 and the second clock signal which has been taken out from a point having the distance L from the turning point B on the downward interconnection 4. In addition, the delay of then third clock signal is reduced as compared with the delay 5.4 ns of the third clock signal in the clock distribution circuit shown in FIG. 1.

The same effects as the clock distribution circuit shown in FIG. 4 can be obtained by placing a first subsidiary buffer and a second subsidiary buffer at points having a distance D (0<D<10 mm) from the turning point B on the upward interconnection 3 and the downward interconnection 4, respectively.

Figure 5:
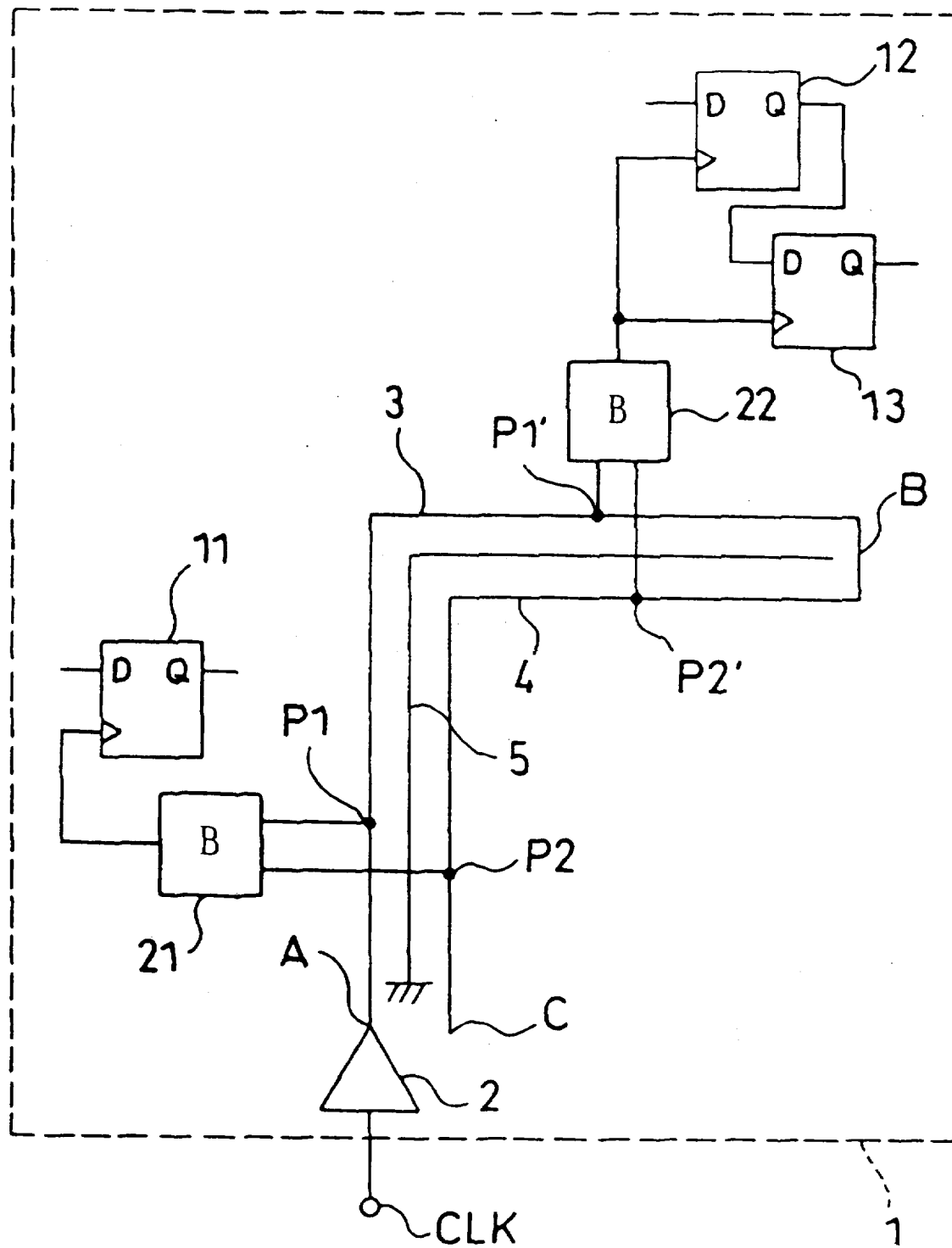
FIG. 5 is a block diagram which shows still another configuration of the clock distribution circuit of the present invention.

The clock distribution circuit shown in FIG. 5 is formed by providing a ground wire 5 between the upward interconnection 3 and the downward interconnection 4 of the clock distribution circuit shown in FIG. 1. The ground wire 5 has shielding effects to protect the interconnections 3 and 4 from clock signal interference even when the external clock signal CLK has a high frequency. The ground wire 5 also mitigates the influence of noise and suppresses an increase in interconnection impedance under a high frequency.

The upward and downward interconnections 3 and 4 and the ground wire 5 shown in FIG. 5 can be easily formed by dividing a wide clock interconnection which extends to the turning point B through the vicinity of the flip-flops 11, 12, and 13 into three in the longitudinal direction, and grounding the middle one.

Figure 6:
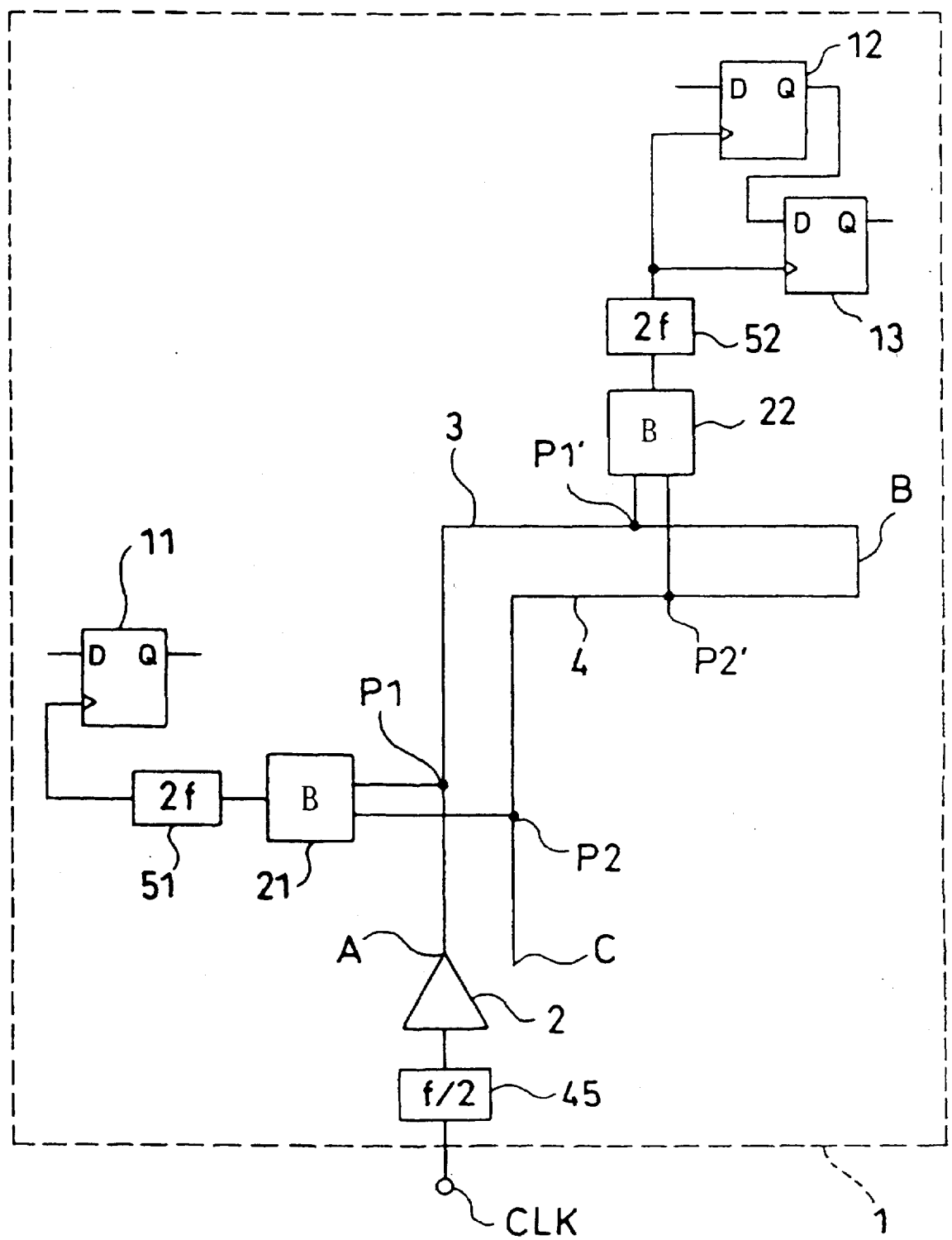
FIG. 6 is a block diagram which shows still another configuration of the clock distribution circuit of the present invention.

The clock distribution circuit shown in FIG. 6 is formed by providing a divider 45 and frequency up converters 51 and 52 to the clock distribution circuit shown in FIG. 1. The divider 45 supplies the clock buffer 2 with a clock signal which has been generated by reducing the frequency of the external clock signal CLK. The frequency up converters 51 and 52 raise the frequencies of the output clock signals of the clock branch circuits 21 and 22 to be equal to that of the external clock signal CLK.

Figure 7:
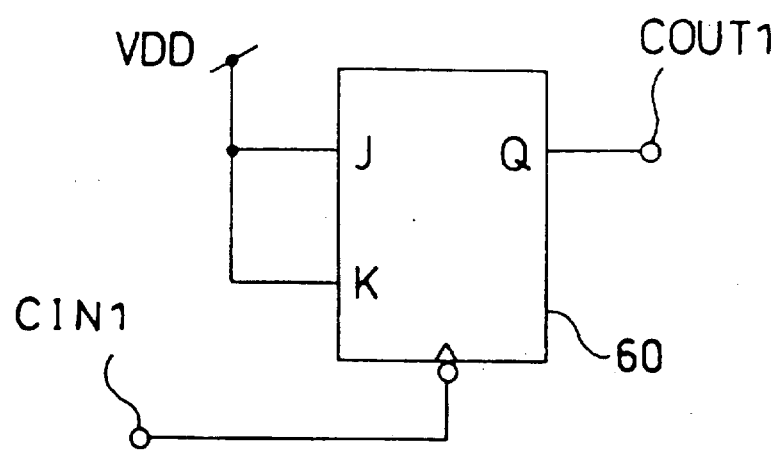
FIG. 7 is a diagram which shows the internal configuration of the divider shown in FIG. 6.

FIG. 7 shows the internal configuration of the divider 45 shown in FIG. 6. An input terminal CIN1 receives an external clock signal CLK, and an output terminal COUT1 supplies the block buffer 2 with a clock signal which has been generated from the external clock signal. The divider 45 is composed of a JK flip-flop 60 where J input terminal and K input terminal are connected to the power source VDD, and the clock input terminal and the output terminal Q are connected to the input terminal CIN1 and the output terminal COUT1, respectively.

Figure 8:
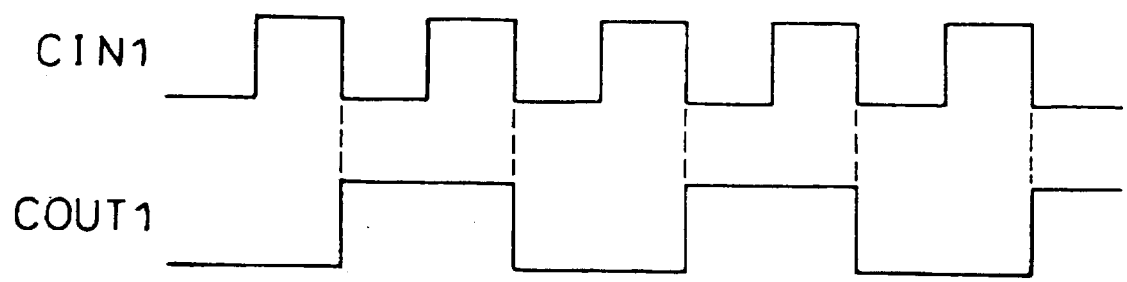
FIG. 8 is a timing chart which depicts the operation of the divider shown in FIG. 7.

FIG. 8 is a timing chart which depicts the operation of the divider 45. Every time the external clock signal CLK given to the input terminal CIN1 makes a HIGH to LOW transition, the clock signal which is supplied from the output terminal COUT1 to the clock buffer 2 makes a transition. In other words, a clock signal which is generated by reducing the frequency of the external clock signal CLK into half is supplied to the clock buffer 2, and as a result, the frequency-half-reduced clock signal is propagated along the upward and downward interconnections 3 and 4.

Figure 9:
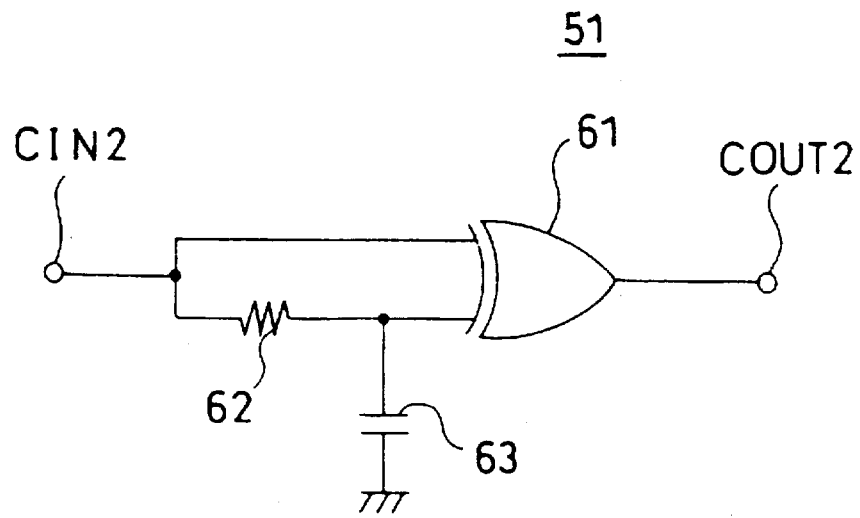
FIG. 9 is a diagram which shows the internal configuration of the frequency up converter shown in FIG. 8.

FIG. 9 is a block diagram which shows the internal configuration of the frequency up converter 51 shown in FIG. 6. An input terminal CIN2 receives a clock signal from the clock branch circuit 21, and an output terminal COUT2 supplies the flip-flop 11 with a frequency-multiplexed clock signal. The clock signal given to the input terminal CIN2 is transferred to the first input terminal of an exclusive OR gate 61, and transferred to the second input terminal of the exclusive OR gate 61 via a resistor 62. A capacitor 63 is disposed between the second input terminal of the exclusive OR gate 61 and the ground. The output terminal of the exclusive OR gate 61 is connected to the output terminal COUT2 of the frequency up converter 51. The other frequency up converter 52 has the same internal configuration as the frequency up converter 51.

Figure 10:
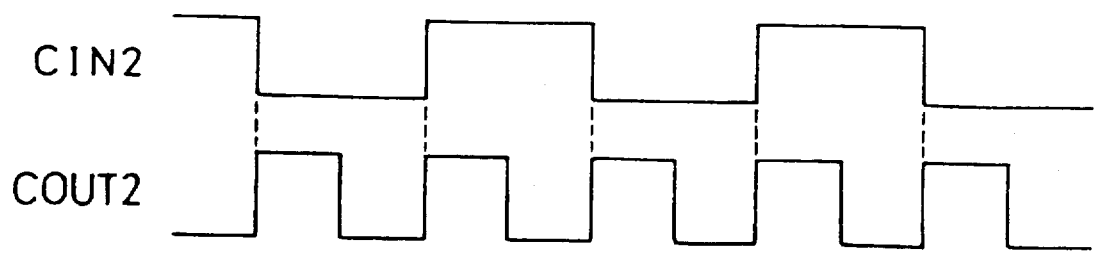
FIG. 10 is a timing chart which depicts the operation of the frequency up converter shown in FIG. 9.

FIG. 10 is a timing chart which depicts the operation of the frequency up converter 51 shown in FIG. 9. When the voltage of the input terminal CIN2 is in low level and the charge voltage of the capacitor 63 is 0 V, the voltage of the output terminal COUT2 is in low level. When the voltage of the input terminal CIN2 makes a LOW to HIGH transition, the capacitor 63 starts to be charged via the resistor 62. However, since the terminal voltage of the capacitor 63 rises slowly, the voltage of the output terminal COUT2 makes a LOW to HIGH transition. Later, when the charge voltage of the capacitor 63 has become high, the voltage of the output terminal COUT2 makes a HIGH to LOW transition. Then, when the voltage of the input terminal CIN2 makes a HIGH to LOW transition, the capacitor 63 falls to be discharged via the resistor 62. However, since the terminal voltage of the capacitor 63 falls slowly, the voltage of the output terminal COUT2 makes a LOW to HIGH transition. Later, when the terminal voltage of the capacitor 63 has become low, the voltage of the output terminal COUT2 makes a HIGH to LOW transition to return to the original state. As the result of repeating these operations, the flip-flop 11 receives a clock signal which has been generated by doubling the frequency of the clock signal supplied from the clock branch circuit 21. The generated clock signal has the same frequency as the external clock signal CLK.

The clock distribution circuit shown in FIG. 6 has succeeded in reducing the power consumption because it is unnecessary for a high-frequency clock signal to propagate in a wide area.

Figure 11:
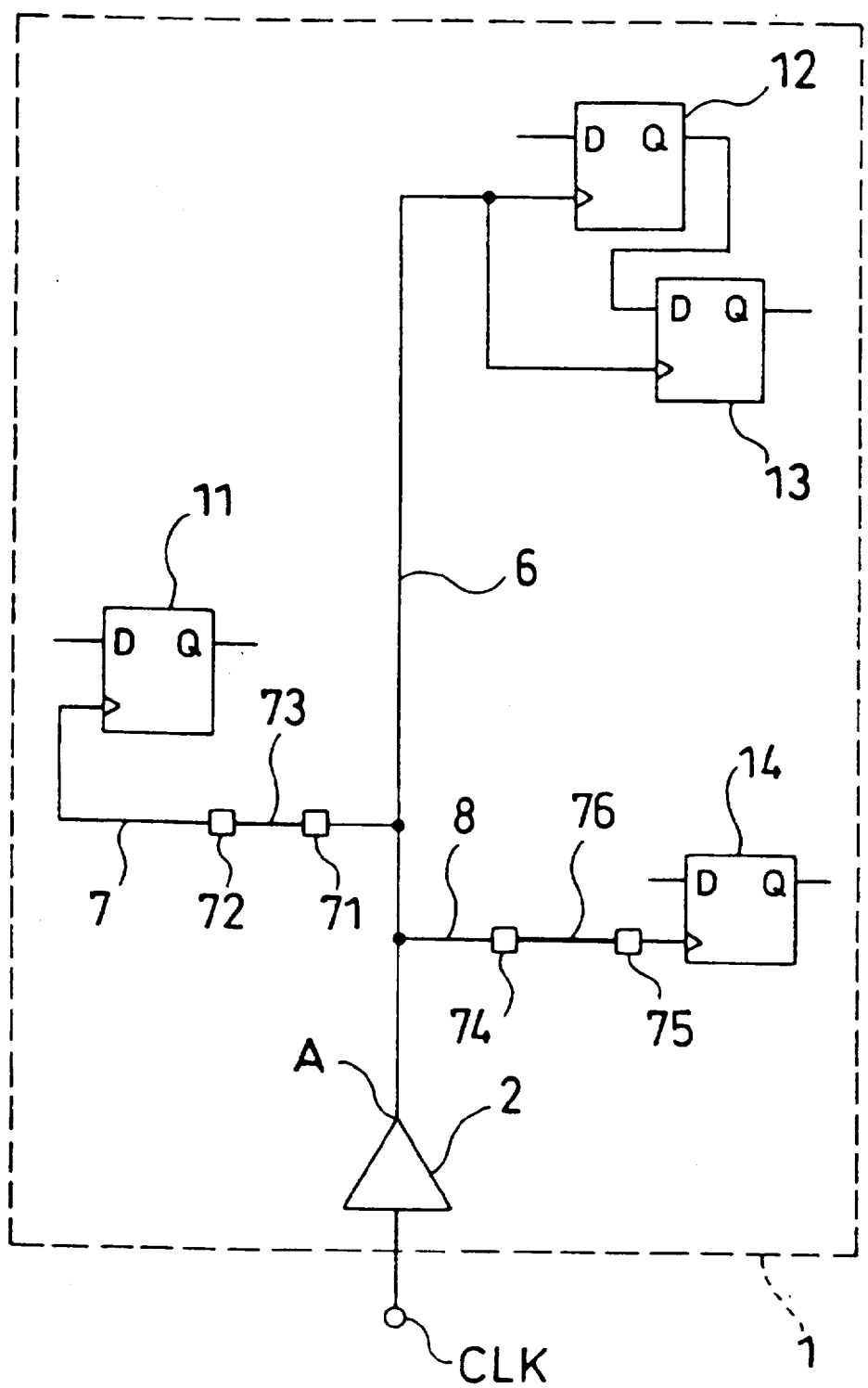
FIG. 11 is a block diagram which shows still another configuration of the clock distribution circuit of the present invention.

FIG. 11 is a block diagram which shows another configuration of the clock distribution circuit of the present invention. A layout area 1 includes a number of flip-flops which compose a synchronous sequential circuit. In this diagram, only four flip-flops 11, 12, 13 and 14 are shown in order to make the explanation simple. A clock buffer 2 introduces the external clock signal CLK as the source clock signal to the layout area 1. The clock interconnection is composed of a main interconnection 6 and branch interconnections 7 and 8. The main interconnection 6 has the longest route which extends from the output terminal A of the clock buffer 2 to the farthest flip-flops 12 and 13. The branch interconnections 7 and 8 which branch from the main interconnection 6 to reach the other flip-flops 11 and 14, respectively. The main interconnection 6 may exclusively consist of an aluminum interconnection layer. The branch interconnections 7 and 8 consist partly of high-resistance interconnection layers 73 and 76 made of polysilicon or the like and partly of aluminum interconnection layers. This composition of the branch interconnections 7 and 8 allows the delay of a clock signal on the main interconnection 6 and the delay of a clock signal on the branch interconnection 7 or 8 to be equal to each other. The aluminum interconnection layers and the high-resistance interconnection layers 73 and 76 are connected via contacts 71, 72, 74, and 75.

Figure 12:
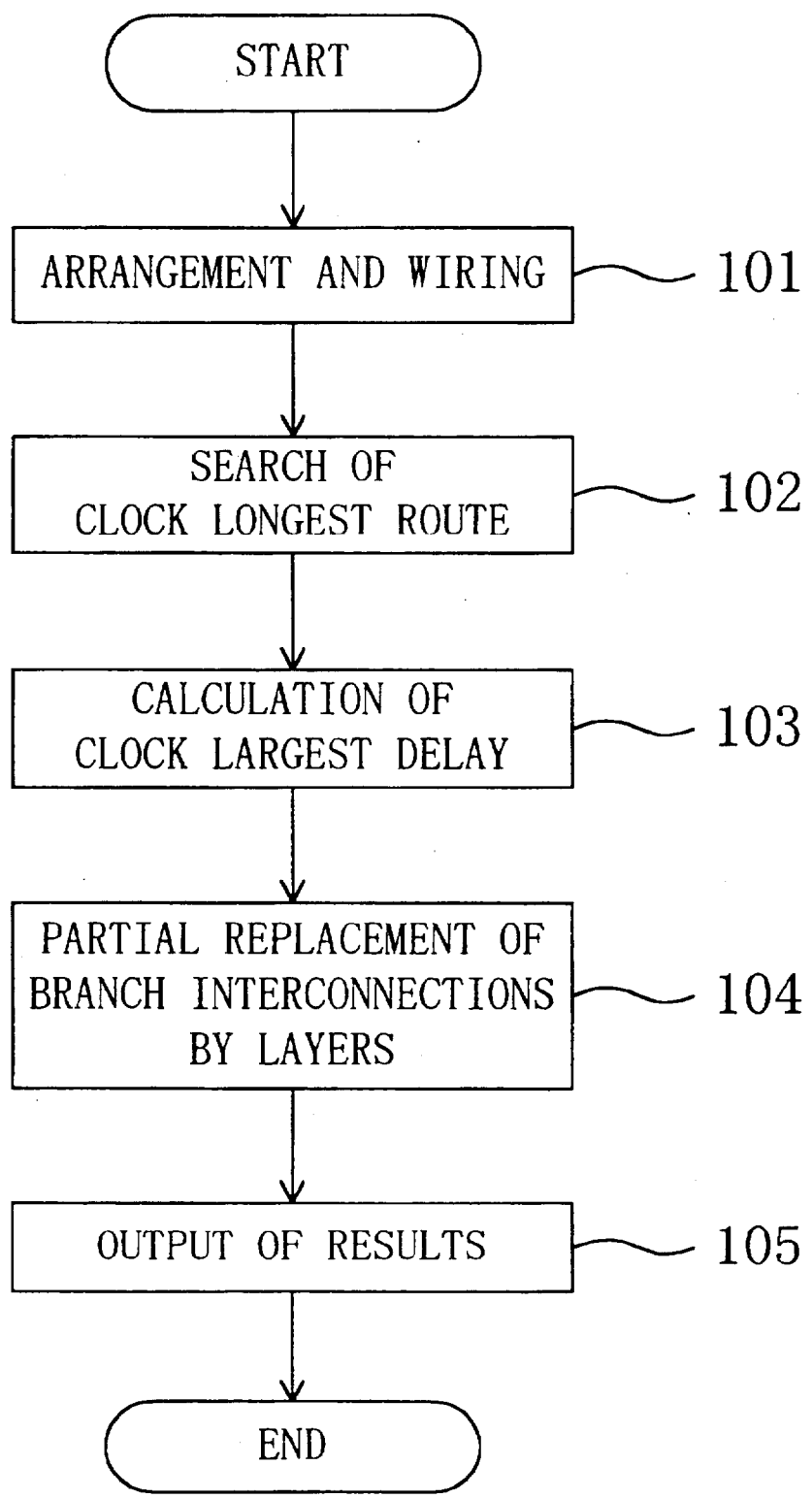
FIG. 12 is a flowchart for automatically designing the clock distribution circuit shown in FIG. 11.

FIG. 12 is a flowchart for automatically designing the clock distribution circuit shown in FIG. 11. At step 101, the clock buffer 2, the flip-flops 11, 12, 13, and 14, and other elements are arranged in the layout area 1. Also, the routes of the clock interconnection consisting of the main interconnection 6 and the branch interconnections 7 and 8 are determined. It is assumed that the entire clock interconnection is composed of aluminum interconnection layers. At step 102, the main interconnection 6 is searched which has the longest route extending to the farthest flip-flops 12 and 13. At step 103, the delay of a clock signal on the main interconnection 6, that is, the clock largest delay Tm is calculated. The largest delay Tm depends on the length of the main interconnection 6, the resistance per unit length, and the capacitance per unit length. Then, the resistance value of each of the branch interconnections 7 and 8 is determined so that the delay of a clock signal on the branch interconnection 7 or 8 is made equal to the largest delay Tm. At step 104, parts of the branch interconnections 7 and 8 are replaced with the high-resistance interconnection layers 73 and 76, respectively. To be more specific, the branch interconnection 8 which is close to the output terminal A of the clock buffer 2 is partly replaced with the longer high-resistance interconnection layer 76, and the contacts 74 and 75 are disposed between the high-resistance interconnection layer 76 and the aluminum interconnection layer. On the other hand, the branch interconnection 7 which is far from the output terminal A of the clock buffer 2 is partly replaced with the shorter high-resistance interconnection layer 73, and the contacts 71 and 72 are disposed between the high-resistance interconnection layer 73 and the aluminum interconnection layer. At step 105, the results of the arranged interconnections are output.

The clock distribution circuit shown in FIG. 11 has achieved a zero clock skew by accommodating the clock interconnection including the main interconnection 6 and the branch interconnections 7 and 8 within a small area. The high-resistance interconnection layers 73 and 76 may be replaced with high-capacitance interconnection layers so that the delay of a clock signal on the main interconnection 6 and that of a clock signal on the branch interconnection 7 or 8 are made equal to each other.

Figure 13:
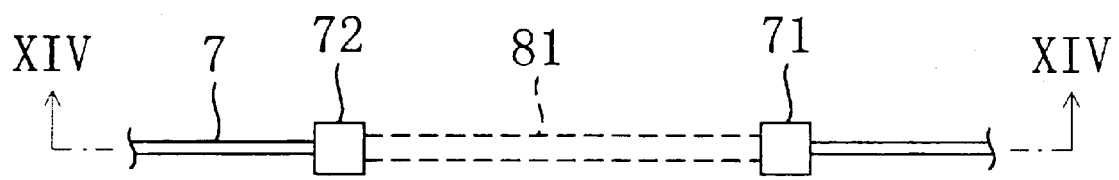
FIG. 13 is a plane view of the high-capacitance interconnection layer which is used in place of the high-resistance interconnection layer shown in FIG. 11.
Figure 14:
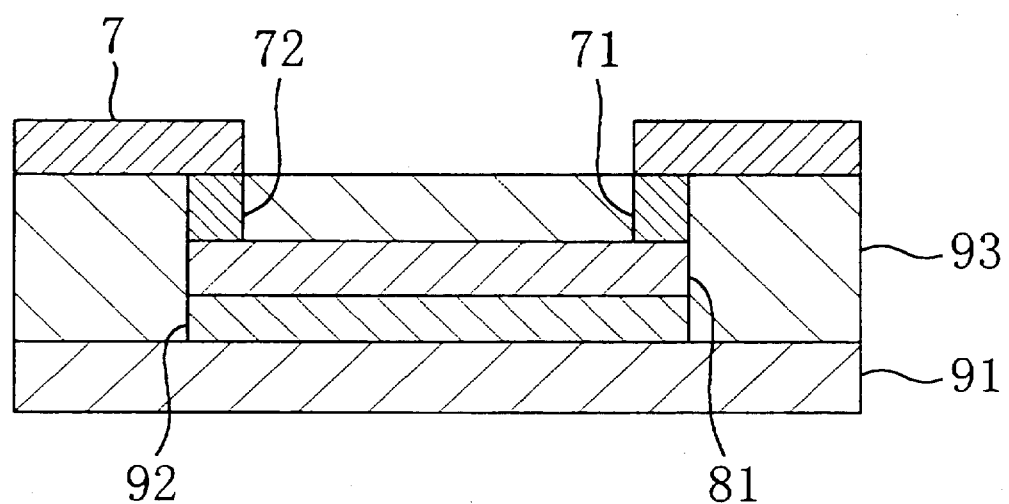
FIG. 14 is a cross section of the high-capacitance interconnection layer 'shown in FIG. 13 taken along the line XIV—XIV.

FIG. 13 is a plane view of the high-capacitance interconnection layer to be used in place of the high-resistance interconnection layer 73 shown in FIG. 11. FIG. 14 is a cross section of the high-capacitance interconnection layer 81 shown in FIG. 13. A semiconductor substrate 91, an $SiO_2$ film 92 having a high permittivity of 4.0, and an SiOF film 93 having a low permittivity of 3.3 to 3.8 are shown in FIG. 14. The semiconductor substrate 91, the $SiO_2$ film 92, and an aluminum interconnection layer which composes the high-capacitance interconnection layer 81 are accumulated in this order. Furthermore, the SiOF film 93 and an aluminum interconnection layer which composes the branch interconnection 7 are accumulated in this order on the semiconductor substrate 91. The $SiO_2$ film 92 is formed to be thinner than the SiOF film 93. The branch interconnection 7 and the high-capacitance interconnection layer 81 are connected to each other via the contacts 71 and 72.

In the structure shown in FIGS. 13 and 14, the capacitance per unit length between the high-capacitance interconnection layer 81 and the semiconductor substrate 91 is greater than the capacitance per unit length between the branch interconnection 7 and the semiconductor substrate 91. The value of the former capacitance can be controlled by changing the thickness of the $SiO_2$ film 92. To be more specific, the closer to the output terminal of the clock buffer a branch interconnection is, the thinner the $SiO_2$ film which is under the high-capacitance interconnection layer is formed to be.

What is claimed is:

1. A clock distribution circuit for distributing clock signals to a plurality of storage elements in a synchronous sequential circuit, said clock distribution circuit comprising:

a clock line which includes an outgoing line and a return line, the outgoing line extending from one end to a turning point while passing along a vicinity of the plurality of storage elements and the return line extending from the turning point to an end point, reversing along the outgoing line;

a clock buffer which receives a clock signal and supplies a source clock signal to said one end of the outgoing line in accordance with the clock signal received; and a plurality of clock branch circuits, each clock branch circuit being disposed in a vicinity of a corresponding one of the plurality of storage elements and receiving a first clock signal on the outgoing line and a second clock signal on the return line and supplying a third clock signal to a corresponding one of the plurality of storage elements, the first clock signal having a pulse width of $S_1+S_2$ and a delay from a time when the clock buffer supplies the source clock signal, the second clock signal having the pulse width of $S_2+S_1$ and a delay from the time when the clock buffer supplies the source clock signal greater than that of the first clock signal, the third clock signal having a delay from the time when the clock buffer supplies the source clock signal greater than that of the second clock signal, said each clock branch circuit including means for making said third clock signal transition in a certain direction when a sum of the time integral of the first clock, from a transition time of the first clock signal in said certain direction, and a time integral of the second clock signal, from a transition time of the second clock signal in said certain direction, becomes equal to $S_1+S_2$.

2. The clock distribution circuit of claim 1, wherein said each clock branch circuit comprises:

a capacitor;

means for charging said capacitor in accordance with the first clock signal on the outgoing line;

means for charging said capacitor in accordance with the second clock signal on the return line; and means for making the third clock signal transition in said certain direction when a charge voltage of said capacitor has reached a predetermined voltage.

3. The clock distribution circuit of claim 2, wherein said each clock branch circuit further comprises means for discharging said capacitor in accordance with the third clock signal which has made a transition in said certain direction.

4. The clock distribution circuit of claim 1, further comprising:

a subsidiary buffer which is placed on the clock line in a vicinity of the turning point.

5. The clock distribution circuit of claim 1, further comprising:

a ground wire which is disposed between the outgoing line and the return line.

6. The clock distribution circuit of claim 1 further comprising:

a divider which receives an external clock signal, generates a clock signal by reducing a frequency of the external clock signal, and supplies the generated clock signal to said clock buffer; and a plurality of frequency up converters, each of said plurality of frequency up converters being disposed between a corresponding one of said plurality of clock branch circuits and a corresponding one of the plurality of storage elements, and raising a frequency of the third clock signal to be equal to said frequency of the external clock signal.

* * * * *

UNITED STATES PATENT AND TRADEMARK OFFICE
CERTIFICATE OF CORRECTION

PATENT NO. : 5,896,055
DATED : April 20, 1999
INVENTOR(S) : TOYONAGA et al.

It is certified that error appears in the above-identified patent and that said Letters Patent is hereby corrected as shown below:

Cover page, under "Assignee": Change "Electronic" to
--Electric--

Signed and Sealed this

Twelfth Day of October, 1999

Attest:

Q. TODD DICKINSON

*Attesting Officer*     *Acting Commissioner of Patents and Trademarks*